(12) United States Patent
Urushihara et al.

(10) Patent No.: US 9,890,256 B2
(45) Date of Patent: Feb. 13, 2018

(54) PROCESS FOR PRODUCING MASTERBATCH

(71) Applicant: ADEKA CORPORATION, Tokyo (JP)

(72) Inventors: Tsuyoshi Urushihara, Saitama (JP); Yota Tsuneizumi, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 15/039,327

(22) PCT Filed: Nov. 19, 2014

(86) PCT No.: PCT/JP2014/080691
§ 371 (c)(1),
(2) Date: May 25, 2016

(87) PCT Pub. No.: WO2015/080004
PCT Pub. Date: Jun. 4, 2015

(65) Prior Publication Data
US 2016/0347917 A1    Dec. 1, 2016

(30) Foreign Application Priority Data

Nov. 26, 2013 (JP) ................. 2013-244324

(51) Int. Cl.
| | |
|---|---|
| *C08K 5/098* | (2006.01) |
| *C08L 67/02* | (2006.01) |
| *C08K 3/00* | (2006.01) |
| *C08K 5/43* | (2006.01) |
| *C08K 5/523* | (2006.01) |
| *C08J 3/22* | (2006.01) |
| *C08J 3/20* | (2006.01) |
| *C08J 5/00* | (2006.01) |
| *C08K 5/47* | (2006.01) |

(52) U.S. Cl.
CPC ............. *C08J 3/226* (2013.01); *C08J 3/201* (2013.01); *C08J 5/00* (2013.01); *C08J 2367/02* (2013.01); *C08K 5/47* (2013.01)

(58) Field of Classification Search
None
See application file for complete search history.

(56) References Cited

U.S. PATENT DOCUMENTS

| | | |
|---|---|---|
| 6,117,550 A | 9/2000 | Studholme |
| 2009/0176913 A1 | 7/2009 | Horikoshi et al. |
| 2010/0093899 A1 | 4/2010 | Saitou et al. |
| 2010/0113710 A1 | 5/2010 | Horikoshi et al. |
| 2011/0015319 A1 | 1/2011 | Nomura |
| 2012/0004363 A1 | 1/2012 | Urushihara et al. |
| 2012/0189793 A1 | 7/2012 | Tsuneizumi et al. |
| 2014/0001672 A1 | 1/2014 | Tsuneizumi et al. |
| 2014/0350139 A1 | 11/2014 | Urushihara et al. |

FOREIGN PATENT DOCUMENTS

| | | |
|---|---|---|
| CN | 101605848 A | 12/2009 |
| JP | 2010-209302 A | 9/2010 |
| JP | 2011-74295 A | 4/2011 |
| JP | 2012-12487 A | 1/2012 |
| JP | 2013-129713 A | 7/2013 |
| WO | WO 2007/129527 A1 | 11/2007 |
| WO | WO 2008/038465 A1 | 4/2008 |
| WO | WO 2009/116499 A1 | 9/2009 |
| WO | WO 2011/040337 A1 | 4/2011 |

OTHER PUBLICATIONS

Lin et al., "Intrinsic Viscosity Change of Polyethylene Terephthalate After Melt Extrusion," China Synthetic Resin and Plastics, vol. 30, No. 3, 2013, pp. 58-60, with an abstract on p. 70 (5 pages total).
International Search Report, issued in PCT/JP2014/080691, PCT/ISA/210, dated Dec. 16, 2014.
Written Opinion Opinion of the International Searching Authority, issued in PCT/JP2014/080691, PCT/ISA/237, dated Dec. 16, 2014.

Primary Examiner — Robert T Butcher
(74) Attorney, Agent, or Firm — Birch, Stewart, Kolasch & Birch, LLP

(57) ABSTRACT

Provided is a method of producing a masterbatch, in which a reduction in the viscosity of a polyester resin is inhibited and thereby a metal salt compound can be incorporated in a large amount. This method is a method of producing a masterbatch that comprises 0.4 to 10 parts by mass of at least one metal salt compound selected from the group consisting of metal benzoates, metal aliphatic carboxylates, metal aromatic phosphates, metal salts of sulfonamide compounds and metal salts of sulfonimide compounds with respect to 100 parts by mass of a polyester resin, wherein when the polyester resin and the metal salt compound are fed to an extruder and kneaded, the cylinder temperature of the extruder is controlled in a range of (the melting point of the polyester resin—60° C.) to (the melting point of the polyester resin—10° C.).

6 Claims, No Drawings

PROCESS FOR PRODUCING MASTERBATCH

TECHNICAL FIELD

The present invention relates to a method of producing a masterbatch in which a metal salt compound is incorporated into a polyester resin. More particularly, the present invention relates to a method of producing a masterbatch wherein, in the step of feeding a polyester resin and a metal salt compound to an extruder and kneading them, the cylinder temperature of the extruder is controlled to be lower than the melting point of the polyester resin.

BACKGROUND ART

As polyester resins that are obtained by polycondensation of a polycarboxylic acid and a polyhydric alcohol, for example, polyethylene terephthalate, polytrimethylene terephthalate, polybutylene terephthalate, polyethylene naphthalate and polybutylene naphthalate are known. Particularly, polyethylene terephthalate is a resin that has excellent transparency, heat resistance, chemical resistance, hygienic properties, staining properties, economic efficiency and the like; therefore, it is widely used in, for example, fibers; film applications; beverage containers (PET bottles) of carbonated drinks, juice drinks, mineral waters and the like; containers of cosmetic and medical products; detergent and shampoo containers; electrophotographic toners; and packaging materials such as food packages, pharmaceutical packages and wrapping materials.

However, despite being crystalline resins, polyester resins, particularly polyethylene terephthalate, have an extremely slow crystallization rate; therefore, the range of molding conditions applicable thereto is very narrow and it is thus difficult to improve the processing cycle, limiting the use of polyester resins as molding materials. In addition, since molded articles obtained by molding polyester resins have low thermal deformation temperatures, there is a problem that their serviceable temperatures are limited.

As a method of improving the crystallization rate of a polyester resin, for example, a method of adding a nucleating agent is employed. Examples of the nucleating agent include polymers, minerals, metal salts of organic and inorganic acids, glass powders and metal powders, more specifically, olefins such as low-density polyethylenes, high-density polyethylenes and linear low-density polyethylenes; minerals (clays) such as graphite, talc and kaolin; metal oxides such as zinc oxide, alumina and magnesium oxide; silica compounds such as silica, calcium silicate and magnesium silicate; metal carbonates such as magnesium carbonate, calcium carbonate, sodium carbonate and potassium carbonate; barium sulfate; calcium sulfate; sodium benzoate; aluminum p-tert-butyl benzoate; metal aromatic phosphates; dibenzylidene sorbitol; sulfonamide compounds; and sulfonimide compounds. For example, in Patent Documents 1 to 4, the present inventions have proposed to incorporate a metal salt of a sulfonamide compound or a metal salt of a sulfonimide compound as a nucleating agent of a polyester resin.

As a method of incorporating a nucleating agent into a polyester resin, for example, a method in which a polyester resin and a nucleating agent are blended in advance using a Henschel mixer, a tumbler mixer or the like and the resulting mixture is fed to an extruder using a feeder or a method in which a polyester resin and a nucleating agent are separately fed to an extruder using quantitative feeders is employed. In these methods, since the nucleating agent and the polyester resin are in powder form and thus blown up into the air during operation, there is a problem that the working environment is adversely affected and contaminated. Accordingly, in recent years, the use of a method of adding a nucleating agent-containing masterbatch is becoming the main trend.

However, when a large amount of a metal salt compound is incorporated into a polyester resin to produce a masterbatch, there is a problem that the resultant cannot be granulated due to a marked reduction in the molecular weight of the polyester resin or the resulting masterbatch is colored and this leads to deterioration of the outer appearance of a molded article containing the masterbatch.

As a method of producing a masterbatch, for example, Patent Document 5 proposes a production method which comprises a first step of kneading a polyester resin and a metal salt compound and a second step of further adding and kneading the polyester resin with a kneaded product obtained in the first step.

RELATED ART DOCUMENTS

Patent Documents

Patent Document 1: WO2007/129527
Patent Document 2: WO2008/038465
Patent Document 3: WO2009/116499
Patent Document 4: WO2011/040337
Patent Document 5: Japanese Unexamined Patent Application Publication No. 2013-129713

SUMMARY OF THE INVENTION

Problems to be Solved by the Invention

Yet, in the production method disclosed in Patent Document 5, there are problems in that, due to a marked viscosity reduction and coloration that occur in association with decomposition of the polyester resin during the first step of kneading the polyester resin and the metal salt compound, stable production of a masterbatch cannot be achieved and the physical properties of a molded article obtained using the resulting masterbatch are deteriorated.

Therefore, an object of the present invention is to provide a method of producing a masterbatch, in which a reduction in the viscosity of a polyester resin is inhibited and thereby a metal salt compound can be incorporated in a large amount.

Means for Solving the Problems

In view of the above-described present circumstances, the present inventors intensively studied to discover that the above-described problems can be solved by performing the step of feeding a polyester resin and a metal salt compound to an extruder and kneading them while controlling the cylinder temperature of the extruder in a prescribed temperature range of lower than the melting point of the polyester resin, thereby completing the present invention.

That is, the present invention is a method of producing a masterbatch that comprises 0.4 to 10 parts by mass of at least one metal salt compound selected from the group consisting of metal benzoates, metal aliphatic carboxylates, metal aromatic phosphates, metal salts of sulfonamide compounds and metal salts of sulfonimide compounds with respect to 100 parts by mass of a polyester resin, wherein when the polyester resin and the metal salt compound are fed to an extruder and kneaded, the cylinder temperature of the extruder is controlled in a range of (the melting point of the polyester resin—60° C.) to (the melting point of the polyester resin—10° C.).

In the production method of the present invention, it is preferred that the polyester resin be a homopolymer selected from the group consisting of polyethylene terephthalate, polytrimethylene terephthalate, polybutylene terephthalate, polycyclohexylene terephthalate, polyethylene naphthalate and polybutylene naphthalate, or a copolymer composed of a combination of two or more thereof.

In the present invention, it is preferred that the metal salt compound be a metal salt of 1,2-benzisothiazol-3(2H)-one-1,1-dioxide. Further, it is preferred that the screw speed of the extruder be set in a range of 100 to 500 rpm.

The masterbatch of the present invention is characterized in that it is obtained by the above-described method of producing a masterbatch.

The present invention provides a molded article obtained by molding the above-described masterbatch.

Effects of the Invention

According to the present invention, a reduction in the melt viscosity can be inhibited, so that a masterbatch can be produced stably. Further, the inhibition of a reduction in the melt viscosity enables to provide a molded article having excellent physical properties.

MODE FOR CARRYING OUT THE INVENTION

The method of producing a masterbatch according to the present invention will now be described in detail.
(Metal Salt Compound)

The metal salt compound used in the present invention is at least one selected from metal benzoates, metal aliphatic carboxylates, metal aromatic phosphates, metal salts of sulfonamide compounds and metal salts of sulfonimide compounds. The metal of the metal salt compound may be, for example, a metal selected from lithium, potassium, sodium, magnesium, calcium, aluminum, strontium, titanium, manganese, iron, zinc, silicon, zirconium, yttrium and barium. The metal of the metal salt compound is preferably potassium, lithium or sodium because these metals have excellent effect of promoting crystallization of polyester resins, and it is particularly preferably sodium.
(Metal Benzoate)

Examples of a metal benzoate used in the present invention include aluminum 4-tert-butyl benzoate, sodium benzoate, potassium benzoate and calcium benzoate.
(Metal Aliphatic Carboxylate)

Examples of a metal aliphatic carboxylate used in the present invention include compounds represented by the following Formula (1):

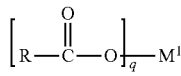

(wherein, $R^1$ represents an aliphatic group having 1 to 30 carbon atoms which optionally has one or more substituents selected from a hydroxyl group and cycloalkyl groups; $M^1$ represents a metal atom; and q is an integer of 1 to 4, representing the valence of the metal atom of $M^1$).

Examples of the aliphatic group having 1 to 30 carbon atoms that is represented by the $R^1$ in the Formula (1) include hydrocarbon groups such as alkyl groups, alkenyl groups, and alkyl groups in which two or more unsaturated bonds are introduced and, optionally, the aliphatic group has a hydroxyl group(s) and/or a cycloalkyl group(s) and is branched.

Specific examples of the metal aliphatic carboxylate include metal salts of acetic acid, propionic acid, lactic acid, butyric acid, valeric acid, caproic acid, 2-ethylhexanoic acid, enanthic acid, pelargonic acid, caprylic acid, neodecylic acid, undecylic acid, lauric acid, tridecylic acid, myristic acid, pentadecylic acid, palmitic acid, margaric acid, stearic acid, nonadecylic acid, arachidic acid, behenic acid, lignoceric acid, cerotic acid, montanoic acid, melissic acid, obtusilic acid, linderic acid, tsuzuic acid, palmitoleic acid, myristoyleic acid, petroselinic acid, oleic acid, elaidic acid, vaccenic acid, linoleic acid, linoelaidic acid, γ-linolenic acid, linolenic acid, ricinoleic acid, naphthenic acid, abietic acid, hydroxyacetic acid, lactic acid, β-hydroxypropionic acid, 2-methyl-β-hydroxy propionic acid, α-hydroxybutyric acid, β-hydroxybutyric acid, γ-hydroxybutyric acid, monomethylol propionic acid, dimethylol propionic acid and 12-hydroxystearic acid.

Examples of a specific structure of the metal aliphatic carboxylate represented by the Formula (1) include those of metal aliphatic carboxylates such as sodium monocarboxylate, lithium monocarboxylate, barium monocarboxylate, magnesium monocarboxylate, calcium monocarboxylate, sodium stearate, sodium montanate, calcium montanate, sodium adipate, sodium carbonate and magnesium carbonate; and metal alicyclic carboxylates such as 2-sodium-bicyclo[2.2.1]heptane-2,3-dicarboxylate. However, the present invention is not restricted by the above-described compounds.
(Metal Aromatic Phosphate)

Examples of a metal aromatic phosphate used in the present invention include compounds represented by the following Formula (2):

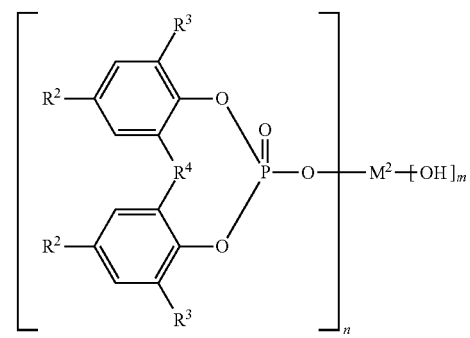

(wherein, $R^2$ represents a hydrogen atom or an alkyl group having 1 to 8 carbon atoms; $R^3$ represents an alkyl group having 1 to 8 carbon atoms; $R^4$ represents an alkylidene group having 1 to 4 carbon atoms; $M^2$ represents an alkali metal atom, an alkaline earth metal atom, a zinc atom or an aluminum atom; when $M^2$ is an alkali metal atom, n is 1 and m is 0; when $M^2$ is an alkaline earth metal atom or a zinc atom; n is 2 and m is 0; and when $M^2$ is an aluminum atom, n is 1 or 2 and m is (3−n)).

Examples of the alkyl group having 1 to 8 carbon atoms that is represented by the $R^2$ and $R^3$ in the Formula (2)

include methyl, ethyl, propyl, isopropyl, butyl, sec-butyl, tert-butyl, isobutyl, amyl, tert-amyl, hexyl, heptyl, octyl, isooctyl, tert-octyl and 2-ethylhexyl, among which a tert-butyl group is particularly preferred.

Examples of the alkylidene group having 1 to 4 carbon atoms that is represented by the $R^4$ in the Formula (2) include methylidene, ethylidene, propylidene and butylidene.

Examples of the alkali metal atom that is represented by the $M^2$ in the Formula (2) include lithium, sodium and potassium, among which sodium and lithium are particularly preferred.

Examples of the alkaline earth metal atom that is represented by the $M^2$ in the Formula (2) include beryllium, magnesium, calcium, strontium, barium and radium, among which calcium and magnesium are particularly preferred.

Examples of a specific structure of the metal aromatic phosphate represented by the Formula (2) include those of the following compounds. However, the present invention is not restricted thereto by any means.

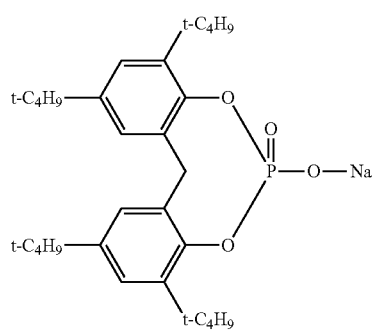

P-1

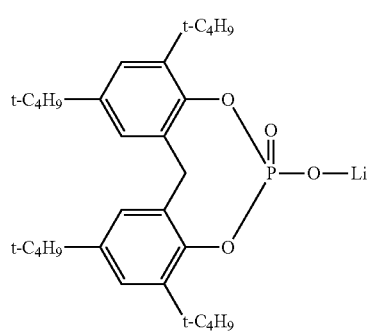

P-2

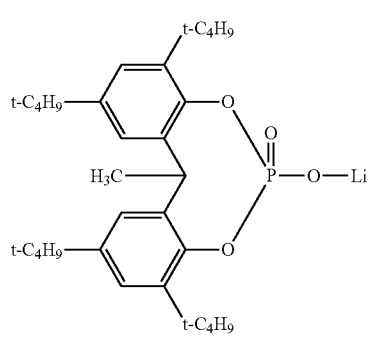

P-3

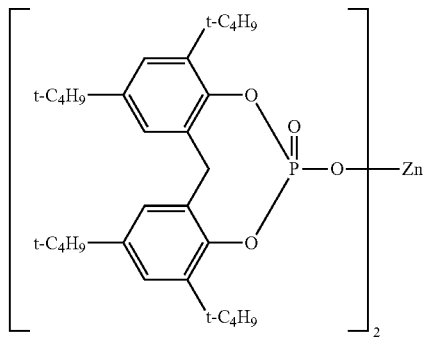

P-4

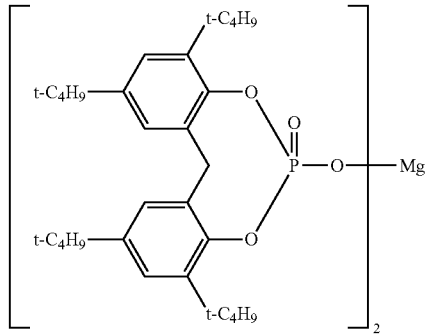

P-5

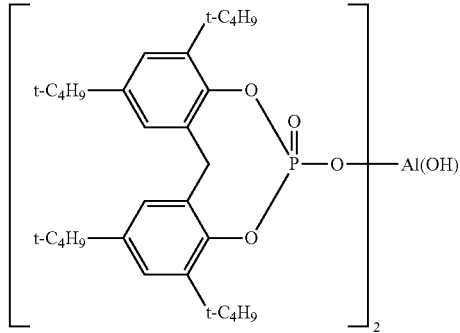

P-6

(Metal Salt of Sulfonamide Compound or Metal Salt of Sulfonimide Compound)

Examples of the metal salts of sulfonamide compounds or the metal salts of sulfonimide compounds include metal salts of benzenesulfonamide, metal salts of benzimide compounds, metal salts of toluene-4-sulfonamide, metal salts of N-phenyl-benzene sulfonamide, metal salts of N-phenyl-4-methyl-benzene sulfonamide, and metal salts of 1,2-benzisothiazol-3(2H)-one-1,1-dioxide. In the masterbatch of the present invention, a metal salt of 1,2-benzisothiazol-3(2H)-one-1,1-dioxide is particularly preferred.

(Polyester Resin)

The polyester resin used in the present invention is a polymer synthesized from a polycarboxylic acid monomer and a polyhydric alcohol component by linking these components via ester bonds. Preferably, the polyester resin contains an aliphatic dicarboxylic acid, an aromatic dicarboxylic acid or an alkyl ester thereof as a main acid component and ethylene glycol as a main glycol component. In the present invention, examples of the aromatic dicarboxylic acid or alkyl ester thereof include terephthalic acid, isophthalic acid, naphthalenedicarboxylic acid, diphenyldicarboxylic acid, and alkyl esters thereof. Further, the polyester resin may also be one which contains other aromatic dicarboxylic acid group, such as a halogenated counterpart of the above-described polyester resin. Thereamong, terephthalic acid or dimethyl terephthalate is preferably used, and the amount of thereof in the acid component is usually not less than 75% by mol, preferably not less than 80% by mol, most preferably not less than 90% by mol. These acid components may be used individually, or two or more thereof may be used in combination.

In addition to the above-described compounds, as a copolymerizable component, an aliphatic dicarboxylic acid such as adipic acid, sebacic acid, succinic acid or oxalic acid, or an alkyl ester thereof may be used as well. Further, a tri- or higher functional carboxylic acid such as trimellitic acid or an acid anhydride such as trimellitic anhydride may also be used in a small amount. Examples of the alkyl ester of an aromatic dicarboxylic acid to be mainly used include methyl esters; however, ethyl esters, propyl esters, butyl esters and the like may also be used individually, or two or more thereof may be used in combination. These alkyl esters can be arbitrary selected in accordance with the intended purpose thereof In the present invention, examples of a glycol component other than ethylene glycol include alkylene glycols such as propylene glycol, 1,4-butanediol, 1,6-hexanediol, neopentyl glycol, decamethylene glycol, cyclohexane dimethanol, poly(oxy)ethylene glycol, polytetramethylene glycol and polymethylene glycol. These glycol components may be used individually, or two or more thereof may be used in combination, and the glycol component other than ethylene glycol can be arbitrarily selected in accordance with the intended purpose thereof. Further, a small amount of a polyhydric alcohol component such as glycerin may also be used, and a small amount of an epoxy compound may be used as well.

The ratio of ethylene glycol in the glycol component is preferably not less than 75% by mol, more preferably not less than 80% by mol, particularly preferably not less than 90% by mol.

Examples of the above-described suitable polyester resin include polyalkylene terephthalates such as polyethylene terephthalate, polybutylene terephthalate and polycyclohexanedimethylene terephthalate; and polyalkylene naphthalates such as polyethylene naphthalate and polybutylene naphthalate.

The polyester resin of the present invention may be a copolymer of plural polyester resins or a modified polyester. Alternatively, the polyester resin of the present invention may be a polymer alloy composed of the above-described suitable polyester resin and other resin described below. The term "polymer alloy" used herein refers to a multicomponent polymer system which may be a block polymer obtained by copolymerization or a polymer blend obtained by mixing or the like.

Examples of the above-described other resin include a wide range of polyester resins, for example, polyether ester resins obtained by copolymerizing polyester constituents with other acid component and/or glycol component (e.g., an acid component such as isophthalic acid, adipic acid, sebacic acid, glutaric acid, diphenylmethane dicarboxylic acid or dimer acid and/or a glycol component such as hexamethylene glycol, bisphenol A or neopentyl glycol alkylene oxide adduct); degradable aliphatic polyesters such as polyhydroxybutyrate, polycaprolactone, polybutylene succinate, polyethylene succinate, polylactic acid resin, polymalic acid, polyglycolic acid, polydioxanone and poly (2-oxetanone); aromatic polyester/polyether block copolymers; aromatic polyester/polylactone block copolymers; and polyallylates.

Further, in the present invention, the polyester resin may also contain a polyester oligomer. As the polyester oligomer, a known compound can be used without any particular restriction.

In the present invention, among these polyester resins, one having a melting point of 200° C. to 300° C. is particularly preferably used. Specifically, polyethylene terephthalate, polytrimethylene terephthalate, polybutylene terephthalate, polycyclohexylene terephthalate, polyethylene naphthalate and polybutylene naphthalate are preferred because they allow the effects of the present invention to be prominently exerted.

<Blending>

In the production method of the present invention, by blending the polyester resin and the metal salt compound, crystallization of the resulting polyester resin composition can be facilitated and the physical properties can be improved. In the present invention, a method in which the polyester resin and the metal salt compound are fed to an extruder from two or more separate feeders connected to a feed port of the extruder and then knead-blended by the extruder may be employed.

Examples of the extruder used in the production method of the present invention include those extruders that comprise a feed port, a vent, a screw, a temperature-controlling function and a discharge port (head), and an extruder in which a screen mesh can be installed in the vicinity of product outlet or an extruder in which a weighing feeder can be installed is preferred.

Extruders take a variety of extrusion systems such as uniaxial system, biaxial system and multiaxial system, and a biaxial screw extruder is preferred in the present invention. The biaxial screw may be of, for example, a bidirectional type, a unidirectional type or a conical type, and any of these types can be employed in the production method of the present invention.

With regard to the feed port, an extruder in which the temperature in the vicinity of the feed port can be set at not higher than the glass transition temperature of the polyester resin is preferred. When this temperature is higher than the glass transition temperature of the polyester resin, the polyester resin contained in the resin composition loaded to a hopper connected to the feed section may be fused to the interior of the extruder and stable feeding from the hopper to the feed section may thus not be achieved.

Further, in order to inhibit decomposition of the polyester resin, it is preferred to replace the atmosphere in the extruder with an inert gas such as nitrogen and/or to perform deaeration via a single-stage or multi-stage vent. Moreover, for improvement of the product quality, it is preferred to arrange a screen mesh between the screw and the head from which a kneaded product is discharged. The screen mesh preferably has a mesh size of 10 mesh (1.5 mm) to 400 mesh (33 μm).

As for the constitution of the screw, it is desired that the screw have a constitution in which the front half on the material supplying side is capable of heating the polyester resin to about the melting point of the polyester resin by applying shear heat thereto, and it is preferred that the screw have a constitution in which the latter half on the product discharge side is capable of dispersing the metal salt compound in the polyester resin.

In the present invention, it is required that the polyester resin and the metal salt compound be kneaded at a cylinder temperature of the extruder in a range of (the melting point of the polyester resin to be kneaded—60° C.) to (the melting point of the polyester resin to be kneaded—10° C.). When the kneading temperature is lower than this range, the torque is increased and this can make it unable to perform extrusion of the kneaded product, whereas when the kneading temperature is higher than the above-described range, the melt viscosity of the resulting strand is reduced, so that stable production of a masterbatch may not be achieved.

It is preferred that the kneading be performed at a screw speed in a range of 100 to 500 rpm. When the screw speed is slower than 100 rpm, the resin temperature is not sufficiently raised and the torque is increased, which can make it unable to perform extrusion of the kneaded product, whereas when the screw speed is faster than 500 rpm, the effect of the shear heat associated with screw rotation is increased and this may cause a reduction in the melt viscosity of the polyester resin.

In the present invention, in order to prevent retention of a kneaded product, it is preferred to set the head temperature of the extruder at the start of the kneading to be not lower than the melting point of the polyester resin. Once the resin temperature is stabilized, the head temperature can be lowered to the cylinder temperature.

Examples of a method for cooling a strand discharged from the extruder include an air-cooling system and a water-cooling system and, in the production method of the present invention, an air-cooling system is preferred. A water-cooling system can also be utilized in the production method of the present invention; however, in order to remove water adhering to the strand, it is desired to introduce a drainer in the upstream of a pelletizer that cuts the strand.

In the masterbatch obtained by the production method of the present invention, as required, other additive(s) may also be incorporated. Examples of a method of incorporating other additive(s) include a method in which the additive(s) in an amount appropriate for the intended purpose thereof is/are mixed with the polyester resin and the resulting mixture is melt-kneaded and granulated. In cases where other additive(s) is/are added, it is preferred that they be blended along with the polyester resin and the metal salt compound; however, the polyester resin and the metal salt compound may be blended and other additive(s) may then be added and blended with the resultant, or other additive(s) may be added to a kneaded product of the polyester resin and the metal salt compound and the resulting mixture may then be molded using a molding machine.

Examples of the above-described other additives include a plasticizer, a filler, a phenolic antioxidant, a phosphorus-based antioxidant, a thioester-based antioxidant, an ultraviolet absorber, a hindered amine compound, a heavy metal inactivator, a flame retardant, hydrotalcite, a lubricant, an antistatic agent, a pigment and a dye.

Examples of the plasticizer include polyethylene glycol butyrate, polyethylene glycol isobutyrate, polyethylene glycol di(2-ethylbutyric acid)ester, polyethylene glycol (2-ethylhexylic acid)ester, polyethylene glycol decanoate, dibutoxyethanol adipate, di(butyldiglycol)adipate, di(butylpolyglycol)adipate, di(2-ethylhexyloxyethanol)adipate, di(2-ethylhexyldiglycol)adipate, di(2-ethylhexylpolyglycol)adipate, dioctoxyethanol adipate, di(octyldiglycol)adipate, di(octylpolyglycol)adipate, ethylene glycol benzoate, diethylene glycol dibenzoate, polyethylene glycol dibenzoate, propylene glycol dibenzoate, dipropylene glycol dibenzoate, tripropylene glycol dibenzoate, 1,3-butanediol dibenzoate, 1,4-butanediol dibenzoate, 1,6-hexanediol dibenzoate, 3-methyl-1,5-pentanediol dibenzoate, 1,8-octanediol dibenzoate, EP-400 (trade name; manufactured by Sanyo Chemical Industries, Ltd.), and polyester-based plasticizers having a condensate of a polybasic acid and a polyhydric alcohol as the basic structure, whose terminals are capped with a monohydric alcohol or a monobasic acid.

As the polybasic acid, any polybasic acid known as a monomer for polyester can be used. Examples thereof include aromatic carboxylic acids such as terephthalic acid, isophthalic acid, trimellitic acid, pyromellitic acid and naphthalene dicarboxylic acid; aliphatic carboxylic acids such as maleic acid, fumaric acid, succinic acid, alkenyl succinic acid and adipic acid; methyl ester compounds of these polybasic acids; and anhydrides thereof. These polybasic acids may be used individually, or two or more thereof may be used in combination.

As the polyhydric alcohol, any polyhydric alcohol known as a monomer for polyester can be used, and examples thereof include aliphatic polyhydric alcohols having 2 to 18 carbon atoms, such as ethylene glycol, 1,2-propylene glycol, 1,3-propylene glycol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolheptane), 3-methyl-1,5-pentanediol-1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol and glycerin; alicyclic polyhydric alcohols such as cyclohexanediol, cyclohexane dimethanol and hydrogenated bisphenol A; and aromatic diols such as ethylene oxide adduct of bisphenol A and propylene oxide adduct of bisphenol A. These polyhydric alcohols may be used individually, or two or more thereof may be used in combination.

Specific examples of the monohydric alcohol include aliphatic alcohols having 8 to 18 carbon atoms, such as octanol, isooctanol, 2-ethylhexanol, nonanol, isononanol, 2-methyloctanol, decanol, isodecanol, undecanol, dodecanol, tridecanol, tetradecanol, hexadecanol and octadecanol; alicyclic alcohols such as cyclohexanol; and aromatic alcohols such as benzyl alcohol, 2-phenylethanol, 1-phenylethanol, 2-phenoxyethanol, 3-phenyl-1-propanol and 2-hydroxyethyl benzyl ether. These monohydric alcohols may be used individually, or two or more thereof may be used in combination.

Specific examples of the monobasic acid include monocarboxylic acids such as caprylic acid, nonanoic acid, capric acid, undecylic acid and laurylic acid; monoesters of dicarboxylic acids; and diesters of tricarboxylic acids. These monobasic acids may be used individually, or two or more thereof may be used in combination.

Examples of plasticizers other than those described above include alicyclic ester-based plasticizers, such as cyclohexane dicarboxylates, cyclohexane dicarboxylates having an epoxy group, and cyclohexane carboxylic anhydrides such as 1,2-cyclohexane dicarboxylic anhydride.

Examples of other plasticizers also include phthalate-based plasticizers such as ethylbenzyl phthalate, butylbenzyl phthalate, isobutylbenzyl phthalate, heptylbenzyl phthalate, (2-ethylhexyl)benzyl phthalate, n-octylbenzyl phthalate, nonylbenzyl phthalate, isononylbenzyl phthalate, isodecylbenzyl phthalate, undecylbenzyl phthalate, tridecylbenzyl phthalate, cyclohexylbenzyl phthalate, benzyl-3-(isobutyryloxy)-1-isopropyl-2,2-dimethylpropyl phthalate, myristylbenzyl phthalate, dibutyl phthalate, diisobutyl phthalate, diheptyl phthalate, di-(2-ethylhexyl)phthalate, di-n-octyl phthalate, dinonyl phthalate, diisononyl phthalate, diisodecyl phthalate, diundecyl phthalate, ditridecyl phthalate, dicyclohexyl phthalate and diphenyl phthalate; isophthalates such as di-(2-ethylhexyl)isophthalate and diisooctyl isophthalate; tetrahydrophthalates such as di-2-ethylhexyl tetrahydrophthalate; adipates such as di-(2-ethylhexyl)adipate, dibutoxyethyl adipate and diisononyl adipate; azelates such as di-n-hexyl azelate and di-(2-ethylhexyl)azelate; sebacates such as di-n-butyl sebacate; maleates such as di-n-butyl maleate and di-(2-ethylhexyl)maleate; fumarates such as di-n-butyl fumarate and di-(2-ethylhexyl)fumarate; trimellitates such as tri-(2-ethylhexyl)trimellitate, tri-n-octyl trimellitate and triisooctyl trimellitate; pyromellitates such as tetra-(2-ethylhexyl)pyromellitate and tetra-n-octyl pyromellitate; citrates such as tri-n-butyl citrate and acetyltributyl citrate; itaconates such as dimethyl itaconate, diethyl itaconate, dibutyl itaconate and di-(2-ethylhexyl)itaconate; ricinoleic acid derivatives such as glyceryl monoricinoleate and diethylene glycol monoricinoleate; stearates such as glycerin monostearate and diethylene glycol distearate; other fatty acid esters such as diethylene glycol dipelargonate and pentaerythritol fatty acid esters; and phosphates such as tributoxyethyl phosphate, triphenyl phosphate, tricresyl phosphate, diphenyldecyl phosphate and diphenyloctyl phosphate. The above-described other plasticizers may be used individually, or two or more thereof may be used in combination.

As a plasticizer(s) in the masterbatch of the present invention, for example, a polyether ester-based plasticizer and/or a benzoic acid ester-based plasticizer that improve the moldability of the polyester resin as well as the shrinkage anisotropy, surface properties and the like of the resulting molded article can be preferably used.

Examples of the above-described filler include those fillers that impart the resulting molded article with rigidity such as mechanical strength, allow the resulting molded article to be hardly anisotropic and have little warpage, and control the fluidity of the polyester resin composition during melt-processing.

Specific examples of such fillers include talc, mica, calcium carbonate, calcium oxide, calcium hydroxide, magnesium carbonate, magnesium hydroxide, magnesium oxide, magnesium sulfate, aluminum hydroxide, barium sulfate, glass powder, glass fibers, clays, dolomite, silica, alumina, potassium titanate whiskers, wollastonite and fibrous magnesium oxysulfate, and fillers having an average particle size (in the case of a spherical or plate-form filler) or an average fiber diameter (in the case of a needle-form or fibrous filler) of 5 μm or less are preferred.

For the purpose of imparting the resulting molded article with rigidity such as mechanical strength, a fiber-form filler is preferably used, and a glass fiber is particularly preferred. Further, in order to obtain a molded article showing limited anisotropy and warping, a plate-form filler is preferably used and, for example, mica or glass flake is particularly preferably used. Moreover, a particulate filler is also preferably used for adjusting the fluidity during the production of a molded article.

The above-described filler may also be treated in advance with a surface treatment agent so as to improve its affinity and adhesion at the interface with the polyester resin. As the surface treatment agent, for example, an aminosilane compound or a surface treatment agent containing at least one epoxy resin is preferably used.

Examples of the aminosilane compound include γ-aminopropyl triethoxysilane, γ-aminopropyl trimethoxysilane and γ-(2-aminoethyl)aminopropyl trimethoxysilane.

Examples of the epoxy resin contained in the surface treatment agent include novolac-type epoxy resins and bisphenol-type epoxy resins, and a novolac-type epoxy resin is preferably used. Examples of the novolac-type epoxy resins include polyfunctional epoxy resins such as phenol novolac-type epoxy resins and cresol novolac-type epoxy resins.

Further, in the surface treatment agent, in addition to the above-described aminosilane compound and epoxy resin, a component(s) such as a urethane resin, an acrylic resin, an antistatic agent, a lubricant and/or a water repellent may also be incorporated in such an amount that does not adversely affect the properties of the surface treatment agent. Moreover, examples of other surface treatment agent include non-novolac-type and non-bisphenol-type epoxy resins, and coupling agents.

Examples of the phenolic antioxidant include 2,6-di-tert-butyl-4-ethylphenol, 2-tert-butyl-4,6-dimethylphenol, styrenated phenol, 2,2'-methylene-bis(4-ethyl-6-tert-butylphenol), 2,2'-thiobis-(6-tert-butyl-4-methylphenol), 2,2'-thiodiethylene-bis[3-(3,5-di-tert-butyl-4-hydroxyphenyl) propionate], 2-methyl-4,6-bis(octylsulfanylmethyl)phenol, 2,2'-isobutylidene-bis(4,6-dimethylphenol), isooctyl-3-(3,5-di-tert-butyl-4-hydroxyphenyl)propionate, N,N'-hexane-1, 6-diylbis[3-(3,5-di-tert-butyl-4-hydroxyphenyl)propionamide 2,2'-oxamide-bis[ethyl-3-(3,5-di-tert-butyl-4-hydroxyphenyl)propionate], 2-ethylhexyl-3-(3',5'-di-tert-butyl-4'-hydroxyphenyl)propionate, 2,2'-ethyl ene-bis(4,6-di-tert-butylphenol), 3,5-bis(1,1-dimethylethyl)-4-hydroxy-benzenepropanoate, C13-15 alkyl esters, 2,5-di-tert-amylhydroquinone, hindered phenol polymer (AO.OH998 (trade name), manufactured by ADEKA Palmarole), 2,2'-methylene-bis[6-(1-methylcyclohexyl)-p-cresol], 2-tert-butyl-6-(3-tert-butyl-2-hydroxy-5-methylbenzyl)-4-methylphenyl acrylate, 2-[1-(2-hydroxy-3,5-di-tert-pentylphenyl) ethyl]-4,6-di-tert-pentylphenyl acrylate, 6-[3-(3-tert-butyl-4-hydroxy-5-methyl)propoxy]-2,4,8,10-tetra-tert-butylbenzo[d,f][1,3,2]-dioxaphosphepin, hexamethylene-bis[3-(3,5-di-tert-butyl-4-hydroxyphenyl)propionate, calcium bis[monoethyl(3,5-di-tert-butyl-4-hydroxybenzyl) phosphonate, a reaction product between 5,7-bis(1,1-dimethylethyl)-3-hydroxy-2(3H)-benzofuranone and o-xylene, 2,6-di-tert-butyl-4-(4,6-bis(octylthio)-1,3,5-triazine-2-ylamino)phenol, DL-a-tocophenol (vitamin E), 2,6-bis(α-methylbenzyl)-4-methylphenol, bis[3,3-bis-(4'-hydroxy-3'-tert-butyl-phenyl)butyric acid]glycol ester, 2,6-di-tert-butyl-p-cresol, 2,6-diphenyl-4-octadecyloxyphenol, stearyl(3,5-di-tert-butyl-4-hydroxyphenyl)propionate, distearyl(3,5-di-tert-butyl-4-hydroxybenzyl)phosphonate, tridecyl-3,5-di-tert-butyl-4-hydroxybenzyl thioacetate, thiodiethylene-bis [(3,5-di-tert-butyl-4-hydroxyphenyl)propionate], 4,4'-thiobis(6-tert-butyl-m-cresol), 2-octylthio-4,6-di(3,5-di-tert-butyl-4-hydroxyphenoxy)-s-triazine 2,2'-methylene-bis(4-methyl-6-tert-butylphenoxy), bis[3,3-bis(4-hydroxy-3-tert-butylphenyl)butyric acid]glycol ester, 4,4'-butylidene-bis(2, 6-di-tert-butylphenol), 4,4'-butylidene-bis(6-tert-butyl-3-methylphenol), 2,2'-ethylidene-bis(4,6-di-tert-butylphenol) 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate 1,3,5-tris(3,5-di-tert-butyl-4-hydroxybenzyl)isocyanurate, 1,3,5-tris(3,5-di-tert-butyl-4-hydroxy benzyl)-2,4,6-trimethylbenzene, 1,3,5-tris[(3,5-di-tert-butyl-4-hydroxyphenyl)propionyloxyethyl] isocyanurate, tetrakis[methylene-3-(3',5'-di-tert-butyl-4'-hydroxyphenyl)propionate]methane, 2-tert-butyl-4-methyl-6-(2-acryloyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-tetraoxaspiro[5.5]undecane, triethylene glycol-bis[β-(3-tertbutyl-4-hydroxy-5-methylphenyl)propionate], stearyl-3-(3, 5-di-tert-butyl-4-hydroxyphenyl)propionic acid amide, palmityl-3-(3,5-di-tert-butyl-4-hydroxyphenyl)propionic acid amide, myristyl-3-(3,5-di-tert-butyl-4-hydroxyphenyl) propionic acid amide and lauryl-3-(3,5-di-tert-butyl-4-hydroxyphenyl)propionic acid amide.

Examples of the phosphorus-based antioxidant include triphenyl phosphite, trisnonylphenyl phosphite, tris(2,4-di-tert-butylphenyl)phosphite, tris(2,4-di-tert-butyl-5-methyl phenyl)phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl)monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl) isopropylidenediphenol diphosphite, tetra(tridecyl)-4,4'-n-butylidene-bis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butylphenyl) biphenylene diphosphonite, 9,10-dihydro-9-oxa-10-phosphaphenanthrene-10-oxide, 2,2'-methylene-bis(4,6-di-tert-butylphenyl)-2-ethylhexyl phosphite, 2,2'-methylene-bis(4, 6-di-tert-butylphenyl)-octadecyl phosphite, 2,2'-ethylidene-bis(4,6-di-tert-butylphenyl)fluorophosphite, tris(2-[(2,4,8, 10-tetrakis-tert-butyldibenzo[d,f][1,3,2]dioxaphosphepin-6-yl)oxy]ethyl)amine, and phosphites of 2-ethyl-2-butylpropylene glycol and 2,4,6-tri-tert-butylphenol.

Examples of the thioether-based antioxidant include tetrakis[methylene-3-(laurylthio)propionate]methane, bis (methyl-4-[3-n-alkyl(C12/C14)thiopropionyloxy]5-tert-butylphenyl)sulfide, ditridecyl-3,3'-thiodipropionate, dilauryl-3,3'-thiodipropionate, dimyristyl-3,3'-thiodipropionate, distearyl-3,3'-thiodipropionate, lauryl/stearyl thiodipropionate, 4,4'-thiobis(6-tert-butyl-m-cresol), 2,2'-thiobis(6-tert-butyl-p-cresol) and distearyl-disulfide.

Examples of the ultraviolet absorber include benzotriazole compounds, triazine compounds, benzophenone compounds, cyanoacrylate compounds, salicylate compounds, oxanilide compounds and other ultraviolet absorbers.

Examples of the benzotriazole compounds include 2-(2-hydroxy-5-tert-octylphenyl)benzotriazole, 2-(2-hydroxy-3, 5-di-tert-butylphenyl)-5-chlorobenzotriazole, 2-(2'-hydroxy)-3'-tert-butyl-5'-methylphenyl)-5-chlorobenzotriazole, 2-(2-hydroxy-3-dodecyl-5-methylphenyl)benzotriazole, 2-(2-hydroxy-3-di-tert-butyl-C7 to 9 mixed alkoxy-carbonylethylphenyl)benzotriazole, 2-(2'-hydroxy-3',5'-dicumylphenyl)benzotriazole, 2,2'-methylene-bis(6-(2H-benzotriazole-2-yl)-4-(1,1,3,3-tetramethylbutyl)phenol), 2-(2'-hydroxy-5'-tert-butylphenyl)benzotriazole, 2-(2'-hydroxy-3',5'-di-tert-butyl phenyl) benzotriazol e, 2-(2-hydroxy-3-sec-butyl-5-tert-butylphenyl)benzotriazole, 2-(2'-hydroxy-5'-methylphenyl) benzotriazole, 2-(2'-hydroxy-3',5'-di-tert-butylphenyl) benzotriazole, 3-(2H-benzotriazolyl)-5-tert-butyl-4-hydroxy-benzenepropanoic acid octyl ester, 2-[2-hydroxy-3-(3,4,5,6-tetrahydrophthalimide-methyl)-5-methylphenyl] benzotriazole, and polyethylene glycol ester of 2-(2-hydroxy-3-tert-butyl-5-carboxyphenyl)benzotriazole.

Examples of the triazine compounds include 2-[4,6-bis (2,4-dimethylphenyl)-1,3,5-triazine-2-yl]-5-(octyloxy)-phenol, 2,4-bis(2,4-dimethylphenyl)-6-(2-hydroxy-4-isooctyl-phenyl)-1,3,5-triazine, 2-(4,6-diphenyl-1,3,5-triazine-2-yl)-5-[2-(2-ethylhexanoyloxy)ethoxy]phenol, polymers of 1,6-hexadiamine with N,N'-bis(2,2,6,6-tetramethyl-4-piperidinyl) and 2,4-dichloro-6-(4-morpholinyl)-1,3,5-triazine, 2-(4,6-bis-(2,4-dimethylphenol)-1,3,5-triazine-2-yl)-5-octyloxy)-phenol, 2-(4,6-diphenyl-1,3,5-triazine-2-yl)-5-[(hexyl)oxy]-phenol, 2-[4-[(2-hydroxy-3-(2'-ethyl) hexyl)oxy]-2-hydroxyphenyl]-4,6-bis(2,4-dimethylphenyl)-1,3,5-triazine, and polycondensates of 2-[4-[2-hydroxy-3-dodecyloxypropyl]oxy]-2-hydroxyphenyl]-4,6-bis(2,4-dimethylphenyl)-1, 3,5-triazine and 2-[4-[(2-hydroxy-3-tridecyloxypropyl)oxy]-2-hydroxyphenyl]-4,6-bis(2,4-dimethylphenyl)-1, 3,5-triazine.

Examples of the benzophenone compounds include 2,4-dihydroxybenzophenone, 2,2'-dihydroxy-4-methoxybenzophenone, 2,2'-dihydroxy-4,4'-dimethoxybenzophenone, 2-hydroxy-4-methoxybenzophenone, 2-hydroxy-4-n-octoxybenzophenone, 2-hydroxy-4-n-dodecyloxybenzophenone, 2,2',4,4'-tetrahydroxybenzophenone, 4-benzoyloxy-2-hydroxybenzophenone, methylene[bis (hydroxymethoxyphenylene)]bis(phenyl)ketone, 1,4-bis(4-bis(4-benzoyl-3-hydroxyphenoxy)-butane, poly-4-(2-acryloxyethoxy)-2-hydroxybenzophenone, 2-hydroxy-4-methoxybenzophenone-5-sulfonic acid, 2-hydroxy-4-methoxybenzophenone-5-sulfonic acid trihydrate, diisodium-2,2'-dihydroxy-4,4'-dimethoxy-5,5'-disulfonic acid benzophenone, 2-hydroxy-4-tert-butyl-4'-(2-methacryloyloxyethoxyethoxy)benzophenone and 5,5'-methylene-bis (2-hydroxy-4-methoxybenzophenone).

Examples of the cyanoacrylate compounds include 1,3-bis[(2'-cyano-3',3'-diphenylacryloyl)oxy]-2,2-bis-{[(2'-cyano-3',3'-diphenylacryloyl)oxy]methyl}-propane, ethyl-2-cyano-3,3-diphenylacrylate, methyl-2-cyano-3-methyl-3-(p-methoxyphenyl)acrylate and (2-ethylhexyl)-2-cyano-3,3-diphenylacrylate.

Examples of the salicylate compounds include phenyl salicylate and 4-tert-butylphenyl salicylate.

Examples of the oxanilide compounds include 2-ethyl-2'-ethoxyoxanilide and 2-ethoxy-4'-dodecyloxanilide.

Examples of other ultraviolet absorbers include N-(4-ethoxycarbonylphenyl)-N'-methyl-N'-phenyl formamidine, N-(ethoxycarbonylphenyl)-N'-ethyl-N'-ethyl-N'-phenyl formamidine, tetraethyl-2,2'-(1,4-phenylene-dimethylidene)-bismalonate, [(4-methoxy-phenyl)-methylene]-dimethyl ester and 4,4'-hexamethylene-bis(1,1-dimethylsemicarbazide).

Examples of the hindered amine-based compound include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, tetrakis(2,2,6,6-tetramethyl-4-piperidyl)-1,2,3,4-butane tetracarboxylate, tetrakis(1,2,2,6,6-pentamethyl-4-piperidyl)-1,2, 3,4-butane tetracarboxylate, bis(2,2,6,6-tetramethyl-4-piperidyl)di(tridecyl)-1,2,3,4-butane tetracarboxylate, bis(1, 2,2,6,6-pentamethyl-4-piperidyl)-di(tridecyl)-1,2,3,4-butane tetracarboxylate, bis(1,2,2,4,4-pentamethyl-4-piperidyl)-2-butyl-2-(3,5-di-tert-butyl-4-hydroxybenzyl) malonate, 1-(2-hydroxyethyl)-2,2,6,6-tetramethyl-4-piperidinol/diethyl succinate polycondensate, 1,6-bis(2,2,6, 6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazine-6-yl]-1, 5,8,12-tetraazadodecane, 1,5,8,12-tetrakis [2,4-bis(N-butyl-N-(1,2,2,6,6-pentamethyl-4-piperidyl) amino)-s-triazine-6-yl]-1,5,8,12-tetraazadodecane, 1,6,11-tris[2,4-bis(N-butyl-N-(2,2,6,6-tetramethyl-4-piperidyl) amino)-s-triazine-6-yl]aminoundecane, 1,6,11-tris[2,4-bis (N-butyl-N-(1,2,2,6,6-pentamethyl-4-piperidyl)amino)-s- triazine-6-yl]amino undecane, bis{4-(1-octyloxy-2,2,6,6-tetramethyl)piperidyl}decanedionate and bis {4-(2,2,6,6-tetramethyl-1-undecyloxy)piperidyl}carbonate.

Examples of the flame retardant include aromatic phosphates such as triphenyl phosphate, tricresyl phosphate, trixylenyl phosphate, cresyldiphenyl phosphate, cresyl-2,6-dixylenyl phosphate, resorcinol-bis(diphenylphosphate), (1-methylethylidene)-4,1-phenylene tetraphenyldiphosphate, 1,3-phenylene-tetrakis(2,6-dimethylphenyl)phosphate, ADK STAB FP-500 (manufactured by ADEKA Corporation), ADK STAB FP-600 (manufactured by ADEKA Corporation) and ADK STAB FP-800 (manufactured by ADEKA Corporation); phosphonates such as divinyl phenylphosphonate, diallyl phenylphosphonate and (1-butenyl)phenylphosphonate; phosphinates such as phenyl diphenylphosphinate, methyl diphenylphosphinate and 9,10-dihydro-9-oxa-10-phosphaphenanthlene-10-oxide derivatives; phosphazene compounds such as bis(2-allylphenoxy)phosphazene and dicresylphosphazene; phosphorus-based flame retardants such as melamine phosphate, melamine pyrophosphate, melamine polyphosphate, melam polyphosphate, ammonium polyphosphate, piperazine phosphate, piperazine pyrophosphate, piperazine polyphosphate, phosphorus-containing vinylbenzyl compounds and red phosphorus; metal hydroxides such as magnesium hydroxide and aluminum hydroxide; and bromine-based flame retardants such as brominated bisphenol A-type epoxy resins, brominated phenol novolac-type epoxy resins, hexabromobenzene, pentabromotoluene, ethylene-bis(pentabromophenyl), ethylene-bis-tetrabromophthalimide, 1,2-dibromo-4-(1,2-dibromoethyl)cyclohexane, tetrabromocyclooctane, hexabromocyclododecane, bis(tribromophenoxy)ethane, brominated polyphenylene ether, brominated polystyrene, 2,4,6-tris(tribromophenoxy)-1,3,5-triazine, tribromophenyl maleimide, tribromophenyl acrylate, tribromophenyl methacrylate, tetrabromobisphenol A-type dimethacrylate, pentabromobenzyl acrylate and brominated styrene. These flame retardants are preferably used in combination with a drip inhibitor such as a fluorocarbon resin and/or a flame retardant aid such as a polyhydric alcohol or hydrotalcite.

The hydrotalcite is a complex salt compound which is known as a natural or synthetic product and composed of magnesium, aluminum, hydroxyl groups, a carbonate group and arbitrary crystal water, and examples thereof include hydrotalcites in which some of the magnesium or aluminum atoms are substituted with other metal such as an alkali metal or zinc; and hydrotalcites in which the hydroxyl group(s) and/or carbonate group is/are substituted with other anionic group(s), more specifically, hydrotalcites represented by the following Formula (3) in which a metal is substituted with an alkali metal. In addition, as an Al—Li hydrotalcite, a compound represented by the following Formula (4) can be used as well.

$$Mg_{x1}Zn_{x2}Al_2(OH)_{2(x1+x2)+4}(CO_3) \cdot pH_2O \quad (3)$$
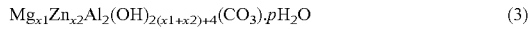

(wherein, x1 and x2 each represent a number that satisfies the conditions represented by the following equations; and p represents 0 or a positive number: $0 \leq x2/x1 \leq 10$, $2 \leq (x1+x2) \leq 20$)

$$[Li_{1/3}Al_{2/3}(OH)_2] \cdot [A^{q-}_{1/3q} \cdot pH_2O] \quad (4)$$
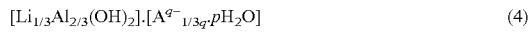

(wherein, $A^{q-}$ represents an anion having a valence of q; and p represents 0 or a positive number)

Further, the carbonate anion in the above-described hydrotalcites may be partially substituted with other anion.

In these hydrotalcites, the crystal water may be dehydrated, and the hydrotalcites may be coated with, for example, a higher fatty acid such as stearic acid, a higher fatty acid metal salt such as alkali metal oleate, a metal organic sulfonate such as alkali metal dodecylbenzenesulfonate, a higher fatty acid amide, a higher fatty acid ester or a wax.

The hydrotalcite may be a naturally-occurring or synthetic hydrotalcite. Examples of a method of synthesizing such a compound include known methods that are described in Japanese Patent Publication (Kokoku) No. S46-2280, Japanese Patent Publication (Kokoku) No. S50-30039, Japanese Patent Publication (Kokoku) No. S51-29129, Japanese Patent Publication (Kokoku) No. H3-36839, Japanese Unexamined Patent Application Publication No. S61-174270, Japanese Unexamined Patent Application Publication No. H5-179052 and the like. Further, the above-exemplified hydrotalcites can be used without any restriction on the crystal structure, crystal particle and the like.

The above-described lubricant is added for the purposes of imparting the surface of the resulting molded article with lubricity and improving the damage-preventing effect. Examples of the lubricant include unsaturated fatty acid amides such as oleic acid amide and erucic acid amide; and saturated fatty acid amides such as behenic acid amide and stearic acid amide. These lubricants may be used individually, or two or more thereof may be used in combination.

Examples of the above-described antistatic agent include cationic antistatic agents such as fatty acid quaternary ammonium ion salts and polyamine quaternary salts; anionic antistatic agents such as higher alcohol phosphates, higher alcohol EO adducts, polyethylene glycol fatty acid esters, anionic alkyl sulfonates, higher alcohol sulfates, higher alcohol ethylene oxide adduct sulfates and higher alcohol ethylene oxide adduct phosphates; nonionic antistatic agents such as polyhydric alcohol fatty acid esters, polyglycol phosphates and polyoxyethylene alkyl allyl ethers; and amphoteric antistatic agents such as amphoteric alkyl betaines (e.g., alkyldimethylamino acetic acid betaine) and imidazoline-type amphoteric activators. These antistatic agents may be used individually, or two or more thereof may be used in combination.

In the masterbatch of the present invention, a mold release agent may also be incorporated. As the mold release agent, one which improves the releasability of the resulting molded article from a mold and allows the molded article to be released even from a mold with a cavity having a reverse-tapered surface is preferred, and specific examples of such a mold release agent include polyethylene-based waxes and low-molecular-weight polypropylenes. These mold release agents may be used individually, or two or more thereof may be used in combination. The term "polyethylene-based waxes" used herein refers to low-molecular-weight polyethylenes that have a molecular weight of about 500 to 10,000.

The amount of the respective additives to be added to the polyester resin used in the present invention is preferably in a range of from an amount at which the effect of the addition is exerted to an amount at which an improvement in the effect of the addition is no longer observed. Preferred amounts of the respective additives with respect to 100 parts by mass of the polyester resin are as follows: 0.1 to 20 parts by mass of a plasticizer(s), 1 to 50 parts by mass of a filler(s), 0.001 to 1 part by mass of a surface treatment agent(s), 0.001 to 10 parts by mass of a phenolic antioxidant(s), 0.001 to 10 parts by mass of a phosphorus-based antioxidant(s), 0.001 to 10 parts by mass of a thioether-based antioxidant(s), 0.001 to 5 parts by mass of an ultraviolet absorber(s), 0.01 to 1 part by mass of a hindered amine compound(s), 1 to 50 parts by mass of a flame retardant(s), 0.03 to 2 parts by mass of a lubricant(s), 0.03 to 2 parts by mass of an antistatic agent(s), and 0.1 to 1 part by mass of a mold release agent(s). It is noted here that these amounts indicate the final amounts of the respective additives used in a molded article obtained using a masterbatch prepared by the production method of the present invention, not the amounts of the respective additives blended with the masterbatch.

The molded article of the present invention is obtained by molding a masterbatch, which is prepared by the production method of the present invention and incorporated into a polyester resin, in accordance with a known molding method such as extrusion molding, injection molding, hollow molding, blow molding or compression molding. The molded article of the present invention can be used as, for example, a food container; a cosmetic or clothing container; a bottle such as a food bottle, a beverage bottle, a cooking oil bottle or a seasoning bottle; a packaging material such as a food packaging material, a wrapping material or a transport packaging material; a sheet or a film, such as a protection film of an electronic material or a protective sheet of an electric appliance; a fiber; a miscellaneous daily goods; or a toy.

EXAMPLES

The present invention will now be described more concretely by way of examples and comparative examples thereof; however, the present invention is not restricted thereto by any means.

Examples 1 to 8 and Comparative Examples 1 to 7

Using a Henschel mixer, a polyester resin and a metal salt compound were blended in accordance with the respective amounts shown in Table 1 or 2, and the resultant was fed to a biaxial extruder (TEX28V manufactured by The Japan Steel Works, Ltd., screw speed: 200 rpm) and kneaded at the cylinder temperature shown in Table 1 or 2. It is noted here that, in Comparative Example 1, a polyester resin was kneaded alone without being blended with any metal salt compound. The production conditions were evaluated in terms of the below-described items.

The melting point of each polyester resin was determined in accordance with the standard prescribed in JIS K7121-1987 "Testing methods for transition temperatures of plastics" and, in a peak of a DSC curve obtained by heating the subject polyester resin from room temperature at a rate of 10° C./min under a nitrogen atmosphere, the melting point was defined as the temperature at the intersection between a straight line drawn by extending the baseline on the high-temperature side to the low-temperature side and a tangent line drawn at a point where the curve on the high-temperature side of the peak has the maximum slope.

<Extrusion Condition>

The extrusion condition was evaluated as follows: an evaluation of "○" was given when the torque of the extruder was stable and extrusion was performed continuously, while an evaluation of "x" was given when the torque of the extruder was increased and the extruder was stopped.

<Strand Condition>

The strand condition was evaluated as follows: an evaluation of "○" was given when the strand discharged from the extruder was stably transferred to the pelletizer, while an evaluation of "x" was given when the strand was broken during transfer and stable production could not be achieved.

TABLE 1

| | | | Example 1 | Example 2 | Example 3 | Example 4 | Example 5 | Example 6 | Example 7 | Example 8 |
|---|---|---|---|---|---|---|---|---|---|---|
| Formulation (parts by mass) | Polyester resin | Polyethylene terephthalate[1] | 100 | 100 | 100 | 100 | 100 | 100 | — | — |
| | | Polybutylene terephthalate[2] | — | — | — | — | — | — | 100 | 100 |
| | Metal salt compound | Compound 1[3] | 0.4 | 1 | 5 | 5 | 5 | 10 | 5 | 5 |
| Processing condition | | Cylinder temperature [° C.] | 230 | 230 | 210 | 230 | 250 | 230 | 190 | 210 |
| Evaluation results | | Extrusion condition | ○ | ○ | ○ | ○ | ○ | ○ | ○ | ○ |
| | | Strand condition | ○ | ○ | ○ | ○ | ○ | ○ | ○ | ○ |

[1] polyethylene terephthalate: MA-2103 (trade name) manufactured by Unitika Ltd., melting point = 262° C.
[2] polybutylene terephthalate: DURANEX 2002 (trade name) manufactured by WinTech Polymer Ltd., melting point = 225° C.
[3] Compound 1: sodium 1,2-benzisothiazol-3(2H)-one-1,1-dioxide

TABLE 2

| | | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Formulation (parts by mass) | Polyester resin | Polyethylene terephthalate[1] | 100 | 100 | 100 | 100 | 100 | — | — |
| | | Polybutylene terephthalate[2] | — | — | — | — | — | 100 | 100 |
| | Metal salt compound | Compound 1[3] | — | 1 | 1 | 10 | 10 | 5 | 10 |
| Processing condition | | Cylinder temperature [° C.] | 200 | 200 | 270 | 190 | 270 | 160 | 250 |
| Evaluation results | | Extrusion condition | x | x | ○ | x | ○ | x | ○ |
| | | Strand condition | — | — | x | — | x | — | x |

[1] polyethylene terephthalate: MA-2103 (trade name) manufactured by Unitika Ltd., melting point = 262° C.
[2] polybutylene terephthalate: DURANEX 2002 (trade name) manufactured by WinTech Polymer Ltd., melting point = 225° C.
[3] Compound 1: sodium 1,2-benzisothiazol-3(2H)-one-1,1-dioxide According to the results of Comparative Example 1 shown in Table 2, without a metal salt compound, even when the polyester resin was kneaded within a range of its melting point −60° C. to its melting point −10° C., the torque of the extruder was increased and the kneading could not be continued.

According to the results of Comparative Examples 2, 4 and 6 shown in Table 2, the materials could not be kneaded at a cylinder temperature lower than the melting point of the respective polyester resin −60° C. Furthermore, according to the results of Comparative Examples 3, 5 and 7 shown in Table 2, although the materials were stably kneaded without any rapid increase in the torque of the extruder when the cylinder temperature of the extruder was higher than the melting point of the respective polyester resin −10° C., since the polyester resins had a low melt viscosity, pelletization was difficult.

In contrast, from the results of Examples 1 to 8 shown in Table 1, it was confirmed that, according to the production method of the present invention, a masterbatch can be stably produced without any problem in kneading performed by an extruder and pelletization.

The invention claimed is:

1. A method of producing a masterbatch that comprises 0.4 to 10 parts by mass of at least one metal salt compound selected from the group consisting of metal benzoates, metal aliphatic carboxylates, metal aromatic phosphates, metal salts of sulfonamide compounds and metal salts of sulfonimide compounds with respect to 100 parts by mass of a polyester resin,
wherein when said polyester resin and said metal salt compound are fed to an extruder and kneaded, the cylinder temperature of said extruder is controlled in a range of (the melting point of said polyester resin −60° C.) to (the melting point of said polyester resin −10° C.).

2. The method of producing a masterbatch according to claim 1, wherein said polyester resin is a homopolymer selected from the group consisting of polyethylene terephthalate, polytrimethylene terephthalate, polybutylene terephthalate, polycyclohexylene terephthalate, polyethylene naphthalate and polybutylene naphthalate, or a copolymer composed of a combination of two or more thereof.

3. The method of producing a masterbatch according to claim 1, wherein said metal salt compound is a metal salt of 1,2-benzisothiazol-3(2H)-one-1,1-dioxide.

4. The method of producing a masterbatch according to claim 1, wherein the screw speed of said extruder is set in a range of 100 to 500 rpm.

5. A masterbatch obtained by the method of producing a masterbatch according to claim 1.

6. A molded article obtained by molding the masterbatch according to claim 5.

* * * * *